United States Patent [19]

Gallus

[11] 4,452,638

[45] Jun. 5, 1984

[54] MARKER FLUID COMPOSITION FOR SPOTTING CEMENT IN OFFSHORE WELLS

[75] Inventor: Julius P. Gallus, Anaheim, Calif.

[73] Assignee: Union Oil Company of California, Los Angeles, Calif.

[21] Appl. No.: 489,361

[22] Filed: Apr. 28, 1983

Related U.S. Application Data

[62] Division of Ser. No. 263,510, May 14, 1981, Pat. No. 4,391,329.

[51] Int. Cl.$^3$ .......................... C04B 7/35; C04B 31/28
[52] U.S. Cl. ........................................................ 106/97
[58] Field of Search ............................... 106/90, 97

[56] References Cited

U.S. PATENT DOCUMENTS

| | | | |
|---|---|---|---|
| 2,010,755 | 8/1935 | Foley | 73/51 |
| 2,308,176 | 1/1943 | Howell | 166/22 |
| 2,609,886 | 9/1952 | Morgan et al. | 106/97 |
| 3,117,146 | 1/1964 | Herschler et al. | 106/90 |
| 3,376,146 | 4/1968 | Mitchell | 106/97 |
| 3,489,219 | 1/1970 | Higgins | 166/253 |
| 3,730,267 | 5/1973 | Scott | 166/291 |
| 4,006,031 | 2/1977 | Ferch et al. | 106/307 |
| 4,043,828 | 8/1977 | Gaines | 106/97 |
| 4,069,870 | 1/1978 | Gallus | 106/97 |
| 4,114,692 | 9/1978 | Gallus | 106/97 |
| 4,144,077 | 3/1979 | Gallus | 106/97 |
| 4,200,153 | 4/1980 | Gallus | 106/97 |

*Primary Examiner*—James Poer
*Attorney, Agent, or Firm*—Dean Sandford; Gregory F. Wirzbicki

[57] ABSTRACT

Cementing casing in an offshore well by displacing a drilling fluid with a settable cement slurry wherein there is injected into the annulus between the sidewall of the well and the casing ahead of the cement slurry a slug of a visually identifiable marker fluid containing cement, water, particulate carbon black, coal dust, and a surface active agent; visually observing when the fluid being displaced from the annulus changes from drilling fluid to marker fluid, and shutting in the well to allow the cement slurry to set.

10 Claims, No Drawings

MARKER FLUID COMPOSITION FOR SPOTTING CEMENT IN OFFSHORE WELLS

This application is a division of application Ser. No. 263,510, filed May 14, 1981, now U.S. Pat. 4,391,329.

BACKGROUND OF THE INVENTION

1. Field of the Invention.

This invention relates to a composition and method for completing offshore wells. More particularly, the invention relates to such a composition and to a method for use of the composition in the cementing of casing of such wells wherein there is injected into the annular space between the sidewall of the well and the casing, after completion of the drilling operation and placement of the casing in the well and just prior to placement of the cement slurry therein, a marker fluid which is distinctively different in color from both the cement slurry and the drilling fluid and therefor visually distinguishable therefrom.

2. Description of the Prior Art

Drilling an offshore well represents many difficulties not encountered in drilling wells onshore. In drilling an offshore well, drilling is usually started by lowering to the bottom of the body of water, from a platform or a floating vessel, a drill string having attached to the bottom thereof a pilot drill bit to drill a pilot hole 20 to 200 feet deep. This pilot hole is then enlarged to a diameter of about 36 inches by successively redrilling the hole with one or two larger diameter bits. Salt water is used as a drilling fluid during drilling of this pilot hole. The salt water is circulated down the drill string, through the drill bit, up the annulus between the sidewall of the borehole and the drill string and out into the surrounding water. The salt water in the bore hole is then displaced by drilling mud. A conductor pipe is lowered into the borehole and cemented in place by displacing the drilling mud by circulating a cement slurry down the casing itself or down the drill string, out a guide shoe on the bottom of the drill string, up the annulus and out into the surrounding water. When the annulus has been filled with cement slurry, the well is shut in until the cement sets. Drilling is then continued to a depth of about 2,000 to 5,000 feet and the next string of casing referred to as "surface casing" cemented in place much as described above. To complete a well it is necessary to subsequently drill to greater depths and cement in place a string of intermediate casing and finally a liner.

In the above-described cementing operations, one of the more difficult aspects is in determining when all of the drilling fluid has been displaced from the annulus by the cement slurry, i.e., when the annulus is filled with cement. The fluids are displaced from the annulus out into the surrounding water at the top of the borehole. Both the drilling fluid and the cement slurry are opaque fluids with approximately the same color. Thus, the water around the borehole in which casing is being cemented becomes quite murky. This makes its difficult for either divers or underwater cameras to detect when all of the drilling fluid has been displaced and cement slurry has filled the annulus and is starting to emerge from the annulus. For a competent cement job, it is essential that the cement slurry completely fill the annulus. At the same time it is not desired to waste cement slurry or rig time by pumping an excessive amount of valuable material out into the surrounding water.

Additionally, in the upper portions of a well the integrity of the reservoir being drilled can be quite low and unpredictable. The cross-sectional area of the annulus may vary considerably at different depths and be difficult to measure. Therefor, it is difficult to calculate the volume of the annulus which would indicate the volume of cement slurry required.

Broadly, hydraulic cement is made by blending together a calcareous material such as limestone, and an argillaceous material, such as clay or shale and feeding the blend into a rotary kiln at high temperature where it fuses into a material called cement clinker. The clinker is cooled, pulverized and blended with a small amount of gypsum which controls the setting time of the finished cement. When mixed with water, the clinkered products hydrate and form a hardened cement. Over the years a very large number of materials have been added to cement slurries in an attempt to modify their properties and/or setting characteristics. Such additives include setting time accelerators, setting time retarders, light weight additives, heavy weight additives, lost circulation control agents, filtration control agents, friction reducers and the like. In some cements not used in wells, coloring agents have been used to impart an attractive appearance to the set cement.

U.S. Pat. No. 3,376,146 to Mitchell covers a low density cement composition for use in wells comprising an aqueous slurry of Portland cement and particulate carbon, e.g., ground anthracite coal, lignite coal, bituminous coal, graphite, petroleum coke or coke derived from coal.

U.S. Pat. No. 2,609,882 to Morgan et al. describes a composition for cementing wells which composition overcomes the adverse effect of lengthening the setting time of cement slurry contaminated with drilling fluid containing certain additives such as caustic or quebracho. The cement composition comprises an aqueous slurry of Portland cement and activated carbon, such as that derived from coconuts, cane sugar, kelp, coal, lignite and the like.

U.S. Pat. No. 4,006,031 to Ferch et al. describes an aqueous dispersion of carbon black and a fluoride-containing anionic or nonionic surfactant for adding to a mineral binding system such as clear concrete to impart outside weather stability and durable black pigmentation.

U.S. Pat. No. 3,117,882 to Herschler et al. covers a colored cement composition containing a coloring composition comprising a substantially water-insoluble pigment such as carbon black admixed with a dialkyl sulfoxide.

U.S. Pat. No. 4,043,828 to Gaines covers a cement slurry having a reduced tendency to shrink prior to hardening. The slurry contains, in addition to a hydraulic cement and water, a particulate carbonaceous material such as delayed coke or naturally occurring coal, for example anthracite, bituminous or lignite coal.

U.S. Pat. Nos. 4,069,870, 4,114,692, 4,144,077 and 4,200,153 to Gallus concern a high temperature cement composition for wells containing, as an additive to resist degradation of the compressive strength, carbon black, anthracite, calcined coke, uncalcined coke, burned oil shale or raw oil shale.

While each of the aforementioned compositions has met with some success in particular applications, the need exists for a further improved composition useful not as a cementing composition itself but in placing a cementing composition in a desired location.

Accordingly, it is a principal object of this invention to provide a composition and method useful in positioning a cementing composition in the annulus of an offshore well.

It is a further object of this invention to provide such a composition and method wherein the annulus can be completely filled with the cementing composition.

It is a still further object of this invention to provide such a composition and method wherein the filling of the annulus with cement is visually observable underwater.

It is another object of this invention to provide such a composition and method wherein the completeness of the displacement by the cementing composition of the fluid occupying the annulus following drilling and placement of the casing in the hole is improved.

Other objects, advantages and features of the invention will be apparent from the following description and claims.

SUMMARY OF THE INVENTION

A marker fluid composition and method of use thereof in placing a cementing composition in the annulus surrounding the casing of an offshore well comprising:
 (a) 100 parts by weight of dry cement,
 (b) about 35 to 56 parts by weight of water,
 (c) about 5 to 8 parts by weight of particulate carbon black,
 (d) about 4 to 6.4 parts by weight of coal dust, and
 (e) about 0.52 to 0.84 parts by weight of surface active agent.

A borehole is drilled offshore and filled with a drilling fluid which is generally relatively light in color. A string of casing is positioned in the borehole, the lower end of the casing being near the bottom of the borehole. An injection string is run inside the casing and the annular space between the casing and the injection string packed off near the bottom of the casing. A slug of about 2 to 20 barrels of the black colored marker fluid followed by a slug of cement slurry is injected via the conduit to the bottom of the borehole and up into the annular space between the sidewall of the borehole and the casing to displace therefrom the drilling fluid which flows out into the water at the mud line or sea floor. The area at the sea floor is observed. When the material emerging from the annulus is observed to change in color from relatively light to black, it is known that the drilling mud has been displaced by marker fluid and cement. Since the volume of marker fluid used is small, it is also known that the annulus is now substantially filled with cement slurry. Also the marker fluid contains cement and will solidify. Injection of fluids is stopped, cement slurry is purged from the injection string, if such an injection string is used, and the well is shut in until the cement slurry occupying the annulus has set.

DETAILED DESCRIPTION OF THE INVENTION

In cementing conductor pipe and surface casing in an offshore well, it is difficult to determine when the annulus between the casing and the sidewall of the borehole is filled with cement slurry. Any fluid displaced from the annulus flows out into the surrounding water rather than being circulated to a mud pit as in the case of most wells drilled onshore. Due to the murky conditions of the water surrounding most offshore wells, and the fact that the fluid being displaced from the annulus, a drilling mud, has about the same relatively light colored appearance under the conditions of observation as the cement slurry doing the displacing, it is difficult to determine when all of the fluid being displaced has in fact been displaced and cement slurry occupies the entire annulus. Calculation of the volume of cement slurry required for displacement from a knowledge of the diameter of the drill bit used, the depth of the borehole and the size of the casing has proven highly inaccurate due to the fact that the strata being drilled, especially that near the mud line, is often highly incompetent and tends to slough and wash out making the diameter of the borehole irregular, uncertain and usually enlarged to an unknown degree.

These and related problems are solved by injecting into the annulus just ahead of the cement slurry the marker fluid of the instant invention which is black in color and thus distinctively different in color from both the fluid which it displaces and the subsequently injected cement slurry which are relatively light in color. During the cementing operation the appearance of the fluid being displaced from the annulus out into the water is observed, as by an underwater television camera or a diver. When it is observed that the color of the fluid emerging from the borehole has changed from the color of the drilling fluid to the color of the marker fluid, pumping of the cement slurry is either stopped or continued only long enough for the small volume of marker fluid used to be displaced out into the water by cement slurry. The marker fluid contains cement and will set. Alternatively, during this latter pumping operation in which the marker fluid is being completely displaced from the annulus, cement slurry may be at least partially displaced from the injection conduit, if used, by pumping a suitable non-setting displacement fluid, such as a drilling mud or water, rather than additional cement slurry. When the marker fluid has been completely displaced, further injection is stopped or continues only long enough to displace all of the cement slurry out of the injection conduit. If necessary the injection conduit can be purged of any remaining cement slurry, as by reverse circulation down the annular space between the casing and the injection conduit and up the injection conduit. The well is shut in for a length of time sufficient for the cement slurry to set, generally about 6 to 24 hours depending on the particular cement slurry employed and the downhole conditions. The well is then ready for drilling to greater depths or known completion operations. In setting casing strings at greater depths, the cement slurry is usually circulated to the surface and into a mud pit rather than being displaced into the water at the sea floor. In such instances where the fluid being displaced from the annulus can be observed directly, there is no need to employ a marker fluid.

The marker fluid is a composition which has essentially the same density, flow characteristics and setting characteristics as cement slurry. When displacing drilling fluid or being displaced by cement slurry during flow through a conduit, the marker fluid does not mix appreciably with either of the other fluids. The marker fluid contains:
 (a) 100 parts by weight dry cement,
 (b) about 35 to 56 parts by weight water,
 (c) about 5 to 8 parts by weight particulate carbon black,
 (d) about 4 to 6.4 parts by weight coal dust, and (e) about 0.52 to 0.84 parts by weight surface active agent.

In order to more distinctively designate which fluid is being displaced from the annulus at any point in time during the cementing operation, it is desired that the marker fluid displace the drilling fluid from the annulus as completely as possible. Likewise it is desired that the cement slurry subsequently displace the marker fluid as completely as possible. Mixing of the marker fluid either with the drilling fluid or the cement slurry should be minimized. However, all three of the fluids are usually aqueous based compositions which tend to mix when in contact. Also, during cementing operations it is often the practice to pump the cement slurry at a relatively high rate so that the slurry moves through the injection string and the annulus in turbulent flow. Thus, there are factors which encourage the mixing of the marker fluid both with the drilling fluid which it displaces and with the cement slurry which follows it. In spite of these adverse factors, it is found that the marker fluid of this invention does not mix appreciably either with the drilling fluid or the cement slurry during the cementing operation.

The choice of cement used as an ingredient in both the marker fluid and the cement slurry is any available hydraulic cement. Usually the same type of cement is used in each composition. Normally, the cement will be a Portland-type oil well cement of one of the classes and types specified by The American Petroleum Institute (API) specification 10A. Depending on the well depth and environment in which the cement is to be used, it will be selected from one of the API classes A through J and will be formulated as an ordinary, moderate sulfate resistant, or high sulfate resistant type cement. The basis for selection of a particular class and type of cement for use in the cement system is well understood by those skilled in the art and is dependent, among other things, upon the depth at which the cement is intended to be used, the temperature, the desired physical requirements and the chemical environment to which the cement mass is to be subjected. In addition, curing time is an important factor in selecting a particular class and type of cement. Typically, the cement utilized in the present invention will be class A, B, C, G or H which are formulated for oil well use at depths of from the surface to about 6,000 feet.

Besides the oil well cements discussed above, other types of cements, including conventional Portland construction cement, can also be utilized in the present invention. For example, high alumina and pozzolan type cements, which are noted for high temperature resistance and high durability under severe environments, for example contact by sea water, are useful. In addition, cements comprising mixtures of Portland cement and pozzolans or fly ash are also excellent cements. In addition, lightweight cement made from Portland cement and calcined shale, thixotropic cement made from Portland cement and calcium sulfate hemihydrate, and expanding cement made from Portland cement and calcium sulfoaluminate can all be employed.

The cement slurry of the present invention may also include any of the conventional additives utilized to alter the setting, curing or physical properties of the cement. These additives are used in the porportions ordinarily specified for conventional cement slurry. For example, various accelerators such as calcium chloride may be used to speed up the setting of the cement. Similarly various retarders may be added to the cement composition to retard the setting of the cement thereby to render the cement slurry pumpable for a longer period of time than would be the case if no additives were used. Typical retarders include free lime, calcium sulfate (as gypsum or plaster of Paris), starches, cellulose products, sugars and the like.

Other additives include the water loss preventatives such as, for example, methyl hydroxy cellulose and ethyl hydroxy cellulose, which serve to prevent separation of the slurry water during pumping and setting of the cement. Similarly lost circulation materials such as gilsonite and density adjusters such as hematite and barite may be used.

In preparing cement slurries used in the process of this invention there is generally employed about 109.5 to 115.2 parts by weight dry cement and additives and about 35 to 52 parts by weight water to form a slurry of pumpable consistency.

The density of most drilling fluids is less than that of most cement slurries. It is preferable that the density of the marker fluid be about the same as or somewhat less than the density of the cement slurry. Thus, the density of the marker fluid is greater than that of the drilling fluid which it displaces. The density of the marker fluid and the cement slurry is typically about 10 to 22 pounds per gallon. The density of the drilling fluid is about 8.7 to 20 pounds per gallon. The viscosity of the marker fluid and cement slurry ranges from about 10 to 700 centipoises at atmospheric conditions. The viscosity of drilling fluid under similar conditions is about 2 to 200 centipoises.

Attempts to compound a marker fluid by adding particulate carbon black to cement slurry are unsuccessful because not enough carbon black can be added to impart a distinctive color to the composition before the cement slurry becomes too viscous to flow and be pumped. When additional water is added to the system the carbon black still can not be readily mixed in because the carbon black is difficult to water wet. When a surface active agent is added to the system, the desired amount of carbon black can be mixed in, but the resulting mixture is relatively low in density. This low density material is not efficient in displacing drilling fluid from the annulus. With the addition of coal dust to the composition, the marker fluid has both pumpability and the desired density.

Particulate carbon black is used in the marker fluid primarily to provide a dark black color. The combustion of fuels with insufficient air produces a black smoke containing extremely black particles which when separated from the combustion gases, comprise a fluffy powder of intense blackness. Any of the well known finely divided forms of carbon black made by the incomplete combustion or thermal decomposition of natural gas or petroleum oil can be used. The principal types of carbon black include those made by the oil furnace process, the thermal decomposition process, the acetylene black process, the lampblack process and the channel black process. The particle size distribution and surface area of the carbon black employed is not believed critical. Carbon blacks having a mean particle size between about 15 and 250 microns and surface areas between about 5 and 350 square meters per gram are believed suitable. Particularly preferred is channel black having the aforementioned properties.

Coal dust is used in the marker fluid primarily to impart a higher specific gravity. Coal, being a naturally occurring material resulting from the accumulation and burial of partially decayed plant matter over earlier geological ages, occurs in a wide variety of forms and compositions. Coal is composed chiefly of carbon, hydrogen and oxygen with small amounts of nitrogen and sulfur and varying amounts of moisture and ash or mineral impurities. Coal being relatively friable readily forms dust during mining and subsequent handling operations. Dust generated in coal preparation plants, such as during pulverization or other handling, is collected as in gravity settling chambers, internal separators, centrifugal collectors, for example, cyclone separators, wet scrubbers, and by fabric filters. The coal dust particles range in size from less than 1 micron to about 20 microns. Coal, excluding peat, is broadly classified by the American Society for Testing Materials as Class I anthracite, Class II bituminous, Class III sub-bituminous and Class IV lignite. Coal dust for use in the marker fluid can be anthracite, bituminous or sub-bituminous. Anthracite coal dust is preferred. Lignite is not suitable due to its relatively low density. Also marker fluids containing lignite dust were found to have a tendency to mix with both drilling fluid and cement slurry when pumped through a conduit between these two fluids. Marker fluids containing one of the other coal dust materials showed relatively less mixing in similar tests.

The particulate carbon black is difficult to water wet and mix uniformly into the marker fluid. Thus, a water-soluble or water-dispersible surface active agent is used to improve the ease with which carbon black can be blended into the marker fluid. Any of the well known anionic, nonionic or amphoteric surface active agents can be used. Typical operable surface active agents are alkyl aryl sulfonates, fatty alcohol sulfates, sulfated and sulfonated amides and amines, sulfated and sulfonated esters and ethers, alkyl sulfonates, the condensation products of a fatty material with ethylene or propylene oxide, the condensation products of phenolic compounds having lateral aliphatic groups with ethylene oxide, amphoteric derivatives of polypeptides, substituted imidazolines, alkyl aminopropionates and dipropionates, carboxylated organic derivatives of ammonium hydroxide and the like. Specific surfactants which can be used are ammonium isopropyl benzene sulfonate, dioctyl sodium sulfosuccinate, nonyl phenol condensed with 10 moles of ethylene oxide, and N-tallow -3- iminodipropionate, disodium salt. The anionic surface active agents are preferred.

Broadly, the marker fluid can be prepared by mixing the ingredients in any order desired. Since only a small slug of marker fluid is used, it is generally prepared batchwise at the surface. Alternatively, the marker fluid can be prepared by jet mixing wherein the dry ingredients are blended into a mixture of water and surface active agent being pumped down an injection string. In batch mixing it is preferred to add the surface active agent to the water in a suitable mixing tank with agitation. While agitation is continued the particulate carbon black and coal dust are added in any order or simultaneously. Finally, the dry cement is mixed in.

Since a cement slurry is required to cement the casing, it is often convenient to use a portion of this readily available slurry in preparing the marker fluid. A unit weight of marker fluid contains more water per unit weight of dry cement than does the cement slurry unless a very light weight type cement is being used. There is placed in a mixing tank the quantity of water required to prepare a given quantity of marker fluid which is in excess of the amount of water which would be provided if the dry cement is instead subsequently added in the form of a cement slurry. The surface active agent is stirred into this quantity of water followed by carbon black and coal dust added in any desired order. Finally a suitable amount of cement slurry is mixed in to provide the cement and the remainder of the water.

The invention is further illustrated by the following examples which are illustrative of various aspects of the invention and are not intended as limiting the scope of the invention as defined by the appended claims.

EXAMPLE 1

A laboratory test is made in which 100 grams of a drilling fluid containing 10 parts by weight bentonite and 90 parts by weight water, having a weight of 8.82 pounds per gallon and a viscosity of 92 centipoises, is placed in a 6-inch long section of glass tubing having an inside diameter of 2 inches. An 18-inch long section of ½-inch inside diameter flexible plastic tubing is attached to the section of glass tubing to form a U tube. The height of the plastic tubing is adjusted to be slightly higher than the height of the section of glass tubing. There is poured into this plastic tubing 50 grams of black marker fluid containing 15 parts by weight water, 0.2 part by weight ammonium isopropyl benzene sulfonate anionic surface active agent, 2 parts by weight bituminous coal dust, 1 part by weight carbon black made by the oil furnace process, and 71 parts by weight cement slurry containing 48 parts by weight A.P.I. class C cement 31 parts by weight water. Next there is poured into this plastic tubing 100 grams of cement slurry containing 69 parts by weight A.P.I. class C cement and 22 parts by weight water. It is observed that the marker fluid displaces the drilling fluid from the glass tubing leg of the U tube. Subsequently the cement slurry displaces the marker fluid from the glass tubing leg of the U tube. No evidence of mixing of any of the three fluids in the glass tubing is visually observed during the test. By observing the fluid coming out of the top of the glass tubing, it is readily apparent whether the fluid being displaced is drilling fluid, marker fluid or cement slurry.

EXAMPLE 2

A well is drilled at an offshore location in 250 feet of water. A metal template having a central opening approximately 40 inches in diameter is lowered to the bottom with drill pipe from a drilling platform. A 12¼-inch diameter pilot hole is drilled to a depth of 200 feet using salt water for a drilling fluid and a split-centering guide to start the hole. This hole is opened up using an 18½-inch and a 36-inch drill bit successively and then filled with aqueous base drilling mud. 30-inch diameter well conductor pipe topped with a spherical centering hanger fitting into the template is lowered into the hole by 4½-inch diameter drill pipe made up in a duplex float collar and having attached to the bottom of the conductor pipe a duplex float shoe. After the conductor pipe is in place, drilling mud is circulated down the drill pipe, out the float shoe and up the annulus between the sidewall of the well and the conductor pipe and out into the water surrounding the borehole to establish circulation through the annulus. Next a 5 barrel slug is marker fluid is pumped down the drill pipe. The 5 barrels of marker fluid is prepared by placing 379 pounds water in a mixing tank and mixing therein 114 pounds nonyl phenol condensed with 10 moles ethylene oxide surface active agent. Next there is stirred into the composition 43 pounds anthracite coal dust and 54 pounds channel black. Next 1,929 pounds cement slurry comprising 553 pounds water and 1,376 pounds A.P.I. class A Portland cement is added to form the marker fluid. Finally, the marker fluid is followed by a cement slurry comprising 45 parts by weight water and 112 parts by weight A.P.I. class A Portland cement. The color of the fluid coming out of the annulus into the surrounding water is observed by an underwater black and white television camera positioned near the borehole. After 80 barrels of cement slurry have been pumped, the fluid coming out of the annulus is observed to change from a relatively light color to a black color. This indicates that the marker fluid is being discharged from the annulus. Five barrels additional cement slurry is pumped to displace the marker fluid from the annulus. Pumping is stopped and the cement slurry in the drill pipe is removed by reverse circulation of water down the annulus between the drill pipe and the conductor pipe and up the drill pipe to the surface. The well is shut in for 16 hours to allow the cement slurry to set. The competency of the cement job is determined by a cement bond log. The well is ready for drilling to greater depths.

While particular embodiments of the invention have been described, it will be understood, of course, that the invention is not limited thereto since many obvious modifications can be made, and it is intended to include within this invention any such modification as will fall within the scope of the appended claims.

Having now described the invention, I claim:

1. A marker fluid composition for use in positioning a cement slurry in the annulus between a borehole and casing in an offshore well comprising:
   (a) 100 parts by weight cement,
   (b) about 35 to 56 parts by weight water,
   (c) about 5 to 8 parts by weight particulate carbon black,
   (d) about 4 to 6.4 parts by weight coal dust, and
   (e) about 0.52 to 0.84 parts by weight surface active agent.

2. The composition of claim 1 wherein the cement is an oil well cement.

3. The composition of claim 2 wherein the oil well cement is selected from the group consisting of A.P.I. Class A, B, C, G or H cement.

4. The composition of claim 1 wherein the cement is selected from the group consisting of Portland cement, pozzolan cement, high alumina cement, lightweight cement, thixotropic cement and expanding cement.

5. The composition of claim 1 wherein the cement and part of the water required is added as a cement slurry.

6. The composition of claim 1 wherein the carbon black is selected from the group consisting of carbon black made by the oil furnace process, the acetylene black process, the lampblack process and the channel black process.

7. The composition of claim 1 wherein the carbon black is made by the channel black process.

8. The composition of claim 1 wherein the coal dust is selected from the group consisting of anthracite, bituminous and sub-bituminous coal.

9. The composition of claim 8 wherein the coal dust is anthracite coal dust.

10. The composition of claim 1 wherein the surface active agent is selected from the group consisting of anionic, nonionic and amphoteric surface active agents.

* * * * *